UNITED STATES PATENT OFFICE.

CHARLES W. HARMON, OF JACKSONVILLE, FLORIDA, ASSIGNOR TO IRMA M. WHITNEY, OF JACKSONVILLE, FLORIDA.

COMPOSITION OF HONEY AND BUTTER.

1,263,237.     Specification of Letters Patent.     Patented Apr. 16, 1918.

No Drawing.     Application filed June 23, 1917. Serial No. 176,528.

*To all whom it may concern:*

Be it known that I, CHARLES W. HARMON, a citizen of the United States of America, residing at Jacksonville, in the county of Duval and State of Florida, have invented a new and useful Composition of Honey and Butter or Oleomargarin, of which the following is a specification.

The object of my invention is to produce a high grade of honey-butter, which is a combination of pure butter and pure granulated or processed honey on a basis of 50% each to be mixed or whipped together by hand, by means of a suitable fork or other instrument or by machinery, until it forms the proper consistency when same is to be molded and packed for market or use as ordinary creamery butter, same to be designated as Harmonized-honey-butter. Also to cover and protect the composition of honey-oleomargarin made in the same manner by mixing the same kind of honey with oleomargarin on the same basis, to be mixed, molded and packed as above specified.

I have discovered that the composition of honey and butter makes a grade of butter equal to if not superior to pure creamery butter, with superior keeping qualities, and a higher food value, with a pleasing flavor, at a much lower cost per pound than creamery butter.

Granulated honey is obtained by subjecting honey to a freezing temperature, which causes the honey to freeze and solidify. When the honey is in this condition it is easily granulated and broken into particles.

I claim.

1. A food compound comprising a mixture of butter and granulated honey.
2. A food compound comprising a mixture of equal parts of butter and granulated honey.
3. A food compound comprising a mixture of a fatty substance of buttery consistency and granulated honey.

CHARLES W. HARMON.

Copies of this patent may be obtained for five cents each, by addressing the "Commissioner of Patents, Washington, D. C."